(12) United States Patent
Brown et al.

(10) Patent No.: US 6,798,990 B2
(45) Date of Patent: Sep. 28, 2004

(54) LASER SAFETY METHOD FOR DC COUPLED PARALLEL OPTICAL LINK

(75) Inventors: London Terry Brown, Rochester, MN (US); Kevin Paul Demsky, Rochester, MN (US); Ladd William Freitag, Rochester, MN (US); Daniel Scott Hedin, Rochester, MN (US); Matthew James Paschal, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 539 days.

(21) Appl. No.: 09/779,599

(22) Filed: Feb. 9, 2001

(65) Prior Publication Data

US 2002/0149810 A1 Oct. 17, 2002

(51) Int. Cl.⁷ .............................................. H04B 10/02
(52) U.S. Cl. ........................ 398/15; 398/38; 398/202; 398/115
(58) Field of Search ............................ 398/15, 38, 202, 398/115, 119, 13, 20, 128; 385/18, 24; 463/25, 11; 250/227.15; 330/308

(56) References Cited

U.S. PATENT DOCUMENTS

| | | | | |
|---|---|---|---|---|
| 4,792,998 A | * | 12/1988 | Toussaint | 398/202 |
| 5,136,410 A | * | 8/1992 | Heiling et al. | 398/15 |
| 5,771,114 A | * | 6/1998 | Andersson et al. | 398/38 |
| 5,919,090 A | * | 7/1999 | Mothwurf | 463/25 |
| 6,285,481 B1 | * | 9/2001 | Palmer | 398/119 |
| 6,504,630 B1 | * | 1/2003 | Czarnocha et al. | 398/15 |
| 6,525,853 B1 | * | 2/2003 | Stuart | 398/115 |

* cited by examiner

Primary Examiner—Jason Chan
Assistant Examiner—David Payne
(74) Attorney, Agent, or Firm—Rabin & Champagne, PC (57) ABSTRACT

A method and apparatus are provided to ensure that laser optical power does not exceed a "safe" level in a DC coupled open loop parallel optical link in the event that a fiber optic ribbon cable is broken or otherwise severed. A duplex parallel optical link includes a transmitter and receiver pair and a fiber optic ribbon that includes a designated number N of channels that cannot be split. The duplex transceiver includes a corresponding transmitter and receiver that are physically attached to each other and cannot be detached therefrom, so as to ensure safe, laser optical power in the event that the fiber optic ribbon cable is broken or severed. Safe optical power is ensured by redundant current and voltage safety checks, and the corresponding low duty cycle signal is generated by a safety pulse generator in the safety channel.

18 Claims, 11 Drawing Sheets

LASER SAFETY METHOD FOR DC COUPLED PARALLEL OPTICAL LINK

FIELD OF THE INVENTION

The present invention relates to the field of fiber optic data communications, in particular fault detection arrangements in a DC coupled parallel optical link.

BACKGROUND OF THE INVENTION

Laser-based devices and systems have been used widely in the fields of, for example, communications, computing technology and medical technology. The lasers utilized in these systems have output optical powers that are potentially harmful to both people and equipment. For instance, such lasers are driven at such a power so as to have damaging effects if exposed to a human eye. Among the safety methods and systems that have been developed, Method and Apparatus for Laser Safety described in U.S. Pat. No. 5,999,549 (Freitag, et al.), resets a laser fault counter if a second laser fault condition is not detected within a predetermined reset time period after a laser is turned on.

In the field of fiber optic data communications, fiber optic data communications links must ensure the optical power being transmitted by the laser remains below a defined level, or a "safe" level, in the event of a single failure in the link so as to avoid the aforementioned potential harm to both people and equipment. The "safe" level may include, for example, a standard established by industry and/or governmental regulations.

For serial optical links, there are at least two exemplary methods for ensuring that transmitted, optical power does not exceed the relevant "safe" level, thus ensuring the safety of the users and any surrounding people as well as preventing any damage to the apparatus by the laser optical power. A first example method includes setting the optical power delivered by the laser to a level that is well below the "safe" level and utilize circuits on the transmitter IC to detect when the optical power level exceeds the safe level. Since the optical power in serial optical links is most often controlled by a monitor photodiode control loop, the laser average optical power is known. Therefore, fault detection circuits are able to easily determine when the average optical power exceeds a threshold limit. That is, since the current in the monitor photodiode is proportional to the optical power output by the laser, the transmitter can detect when the monitor photodiode current exceeds a threshold limit.

A second example method for ensuring that transmitted optical power does not exceed the safe level in a serial optical link includes an Open Fiber Control (OFC) handshake protocol. This example protocol is used when the laser-driving optical power in normal data mode is set above the safe level. Thus, when a serial optical link fiber is pulled, according to the OFC protocol, the laser light is pulsed at an extremely low duty cycle (on for approximately 150 psec, off for approximately 10 sec) to ensure that the average laser optical power does not exceed the safe level. Similar to the first method, fault detection circuits on the transmitter side also ensure that a fault in the corresponding laser driving circuit does not cause the average optical power to exceed the safe level.

However, such example methods of ensuring that the laser optical power remains at or below a safe level are not applicable to open loop parallel optical links or even DC coupled open loop parallel optical links. That is, in open loop parallel optical links, including DC coupled open loop parallel optical links, the average optical power is unknown, because there are no monitor photodiodes. Also, the total average optical power of a parallel link can be greater than a serial link, because multiple laser are simultaneously emitting light. Thus, the example fault detection methods described above are inappropriate since the aggregate optical power in an open loop parallel optical link is above the safe level and is much higher than that of a serial link.

Figure 11:
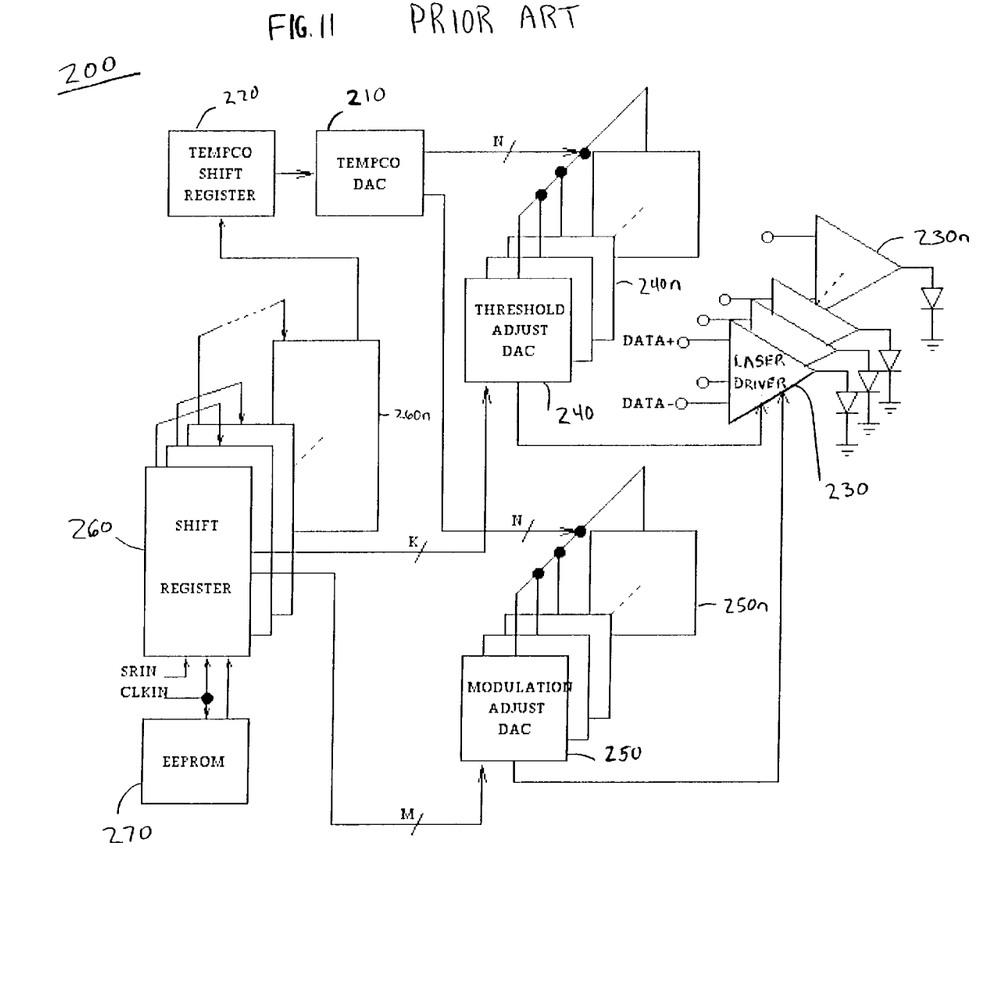
FIG. 11 is an example of an open loop parallel optical transmitter.

For instance, FIG. 11 shows an open loop parallel optical transmitter which includes N channels. The parallel optical transmitter 200 includes global temperature coefficient adjustment DAC (TEMPCO DAC) 210 and global temperature coefficient adjustment shift register (TEMPCO SHIFT REGISTER) 220 which holds bits for the TEMPCO DAC 210. Each of channels 0 through N include a respective laser driver 230, a threshold current adjustment DAC 240, a modulation current adjustment DAC 250, and a shift register to hold the bits for each DAC 260. EEPROM 270 stores the bits in a non-volatile memory when the parallel transmitter is powered off. This parallel transmitter, however, does not show any method for preventing the aggregate optical power out of the lasers of channels 0 through N from exceeding the "safe" level.

Open loop parallel optical links, including DC coupled open loop parallel optical links, present a challenge, because the average optical power is not monitored by a photodiode and multiple lasers are emitting light simultaneously. The fault detection methods, therefore, are very much different from a serial link.

Figure 9:
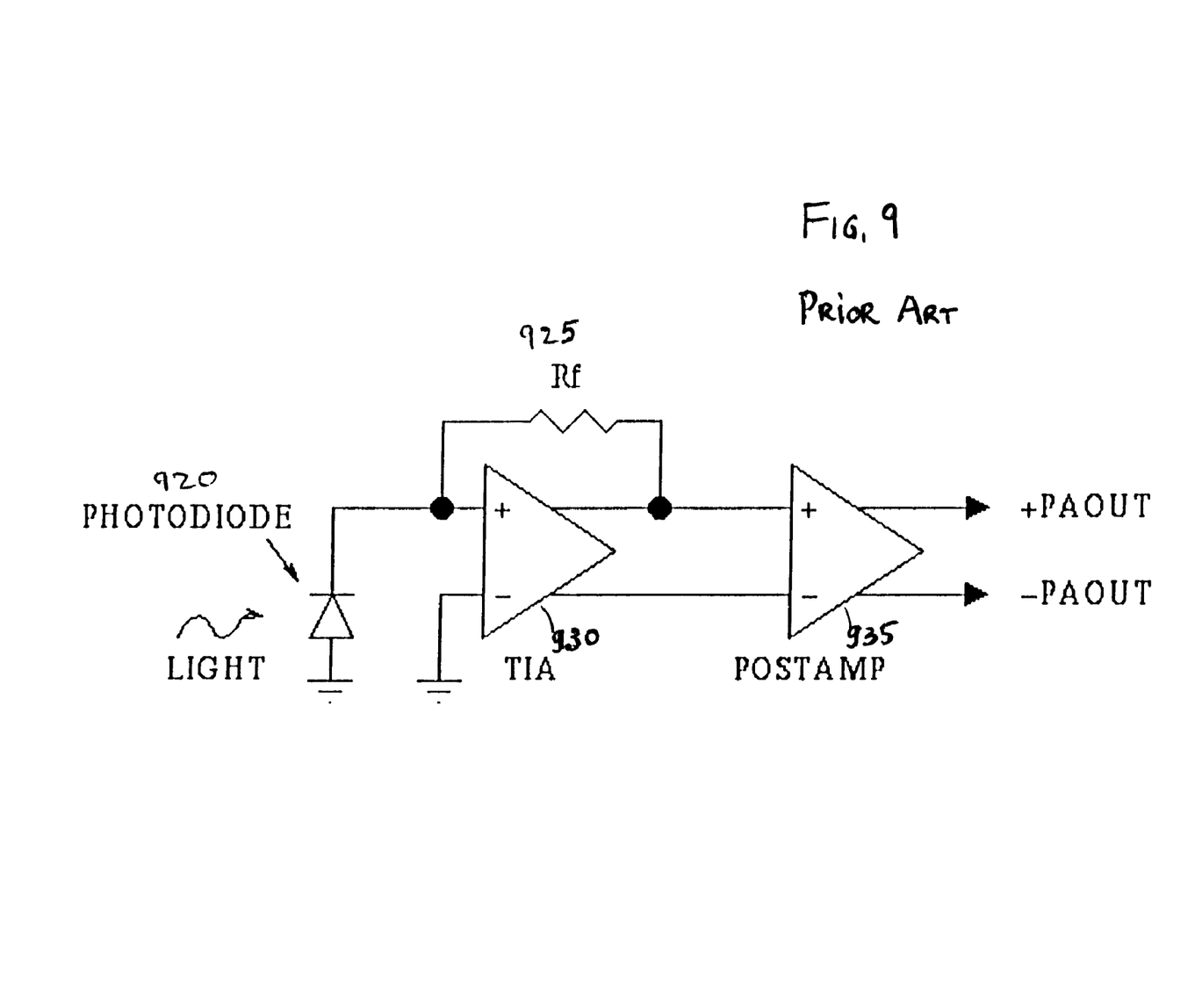
FIG. 9 shows a single channel DC coupled receiver.
Figure 10:
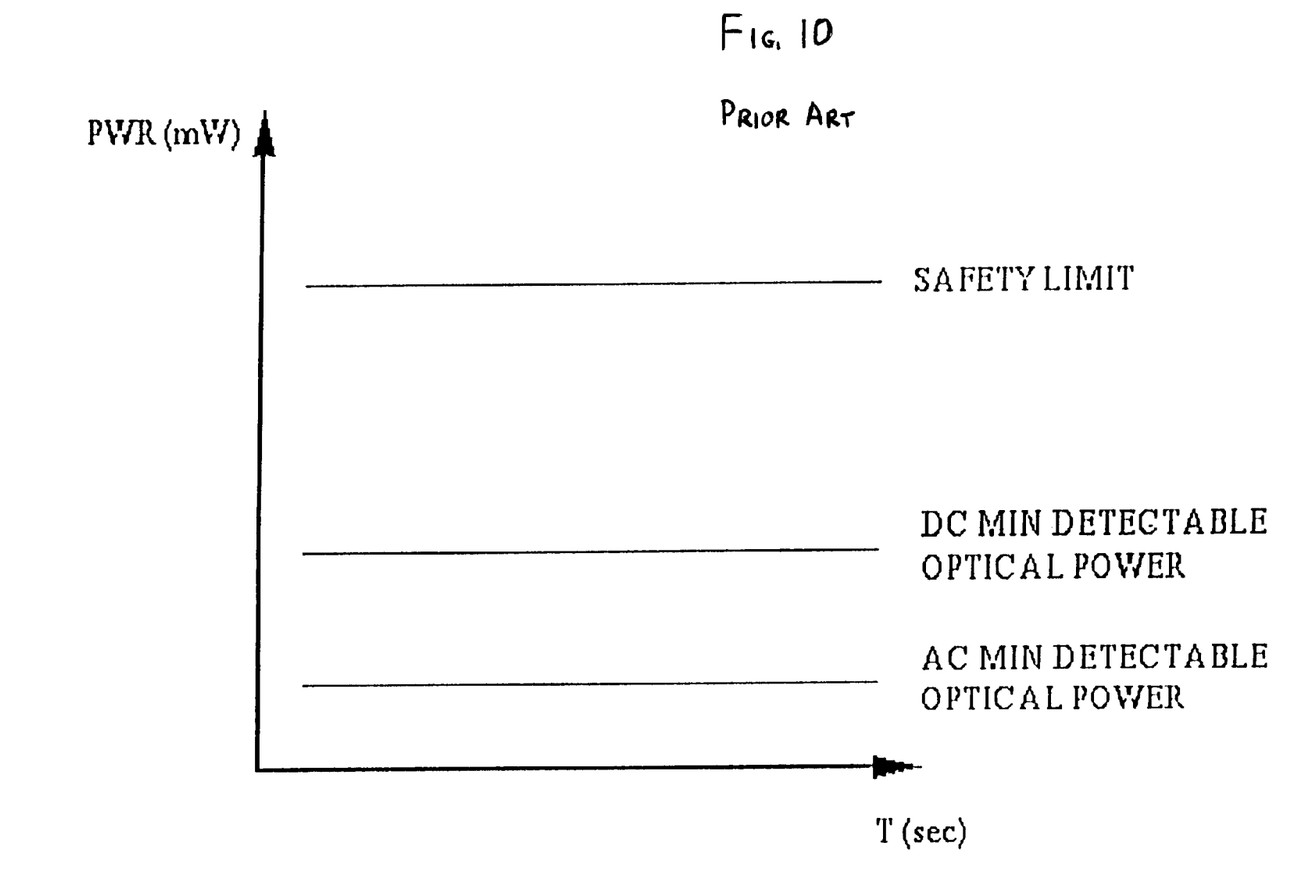
FIG. 10 shows the relationship between safety limits for an AC coupled link and a DC coupled link.

Also, DC coupled parallel optical links have inherently lower sensitivity than AC coupled links. A diagram of a single channel DC coupled receiver is shown in FIG. 9. In AC coupled optical links, as in the examples described above, the receiver's decision threshold (difference between a logic 0 and a logic 1) is set by a capacitor. Capacitors are passive, lossless, and noiseless. Without capacitors, an active transistor network must be employed to set the decision threshold in the post amp 935 of FIG. 9. Transistors induce noise into the system, thus, reducing the signal to noise (S/N) ratio. A DC coupled link also causes problems with biasing the photodiode 920 using a low power supply voltage. The photodiode 920 cannot be biased independent of the transimpedance amplifier (TIA) 930. Instead, the feedback resistor 925 (Rf), must be used to bias the photodiode 920. With a low power supply voltage, the voltage drop across Rf 925 must be small, therefore, Rf 925 must be small. Since the noise induced by TIA 930 is inversely proportional to the value of Rf 925, reducing Rf 925 increases the noise of the TIA output. This, in turn, decreases the S/N ratio. Both the lower S/N ratio of the TIA 930 and the post amp 935 contribute to the lower sensitivity of the overall DC coupled parallel optical link. Compared to an AC coupled link, this leaves less difference between the safety limit and the minimum optical power that can be detected by the receiver. This phenomena is depicted in FIG. 10, wherein the safety limit is the same for both the AC and DC coupled links, although the minimum detectable optical power is lower for the AC coupled link. The low sensitivity of the DC coupled optical link requires higher optical power to be transmitted, which presents a safety problem.

SUMMARY OF THE INVENTION

It is, therefore, a principle object of this invention to provide a laser safety method for DC coupled parallel optical links.

It is another object of the invention to provide a laser safety method for DC coupled parallel optical links that solves the problems described above.

These and other objects of the present invention are accomplished by the laser safety method for DC coupled parallel optical links disclosed herein.

These and other objects are addressed by the present invention which includes a duplex DC coupled parallel optical link, by which the transmitted optical power is high enough to be detected by a receiver yet low enough so as not to not exceed a safety limit.

The present invention relates to a duplex DC coupled parallel optical link that includes a matched transmitter and receiver pair that cannot be physically detached from one another and a fiber optic ribbon cable that cannot be split. The duplex DC coupled parallel optical link of the present invention requires no OFC, thus greatly reducing the time between power up and when the link is ready to send data. There is also provided a margin between the peak optical power set point and the minimum sensitivity of the receiver by not requiring the peak optical power to be set below the safety limit.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written disclosure focuses on disclosing example embodiments of this invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION OF PREFERRED EMBODIMENTS

Before beginning a detailed description of the invention, it should be noted that, when appropriate, like reference numerals and characters may be used to designate identical, corresponding or similar components in differing figure drawings. Further, in the detailed description to follow, example embodiments and values may be given, although the present invention is not limited thereto.

Figure 1:
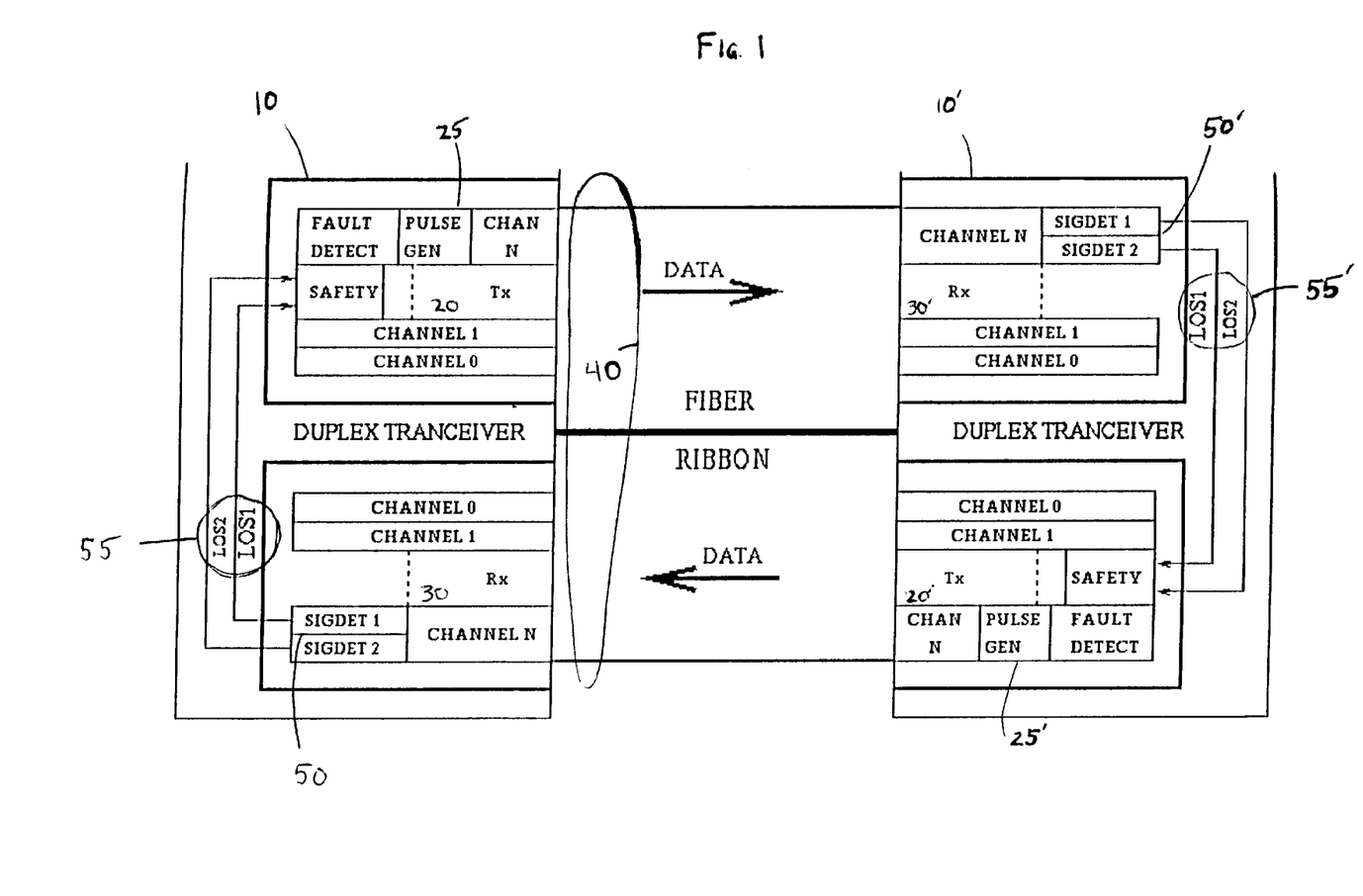
FIG. 1 shows a DC coupled parallel optical link between duplex transceivers according to an example of the present invention.

To ensure safe optical power is transmitted at all times, a duplex DC coupled solution as shown in FIG. 1 was developed. Each duplex transceiver 10 includes both a parallel optical transmitter 20 and 20' and a parallel optical receiver 30 and 30' packaged together along with a fiber ribbon cable 40 where both directions of light travel are fixed together. Fiber ribbon cable 40 includes N fibers which are bundled together and cannot be split therefrom. Channels 0 through N on both the transmitter and receiver sides include one channel which is designated as the safety channel. When the fiber ribbon 40 is connected at both ends of the link, that is between both transceivers 10 and 10', the designated safety channel on both the transmitter and receiver sides function as normal data channels. However, when the fiber ribbon 40 is pulled or is otherwise severed, the signal detectors 50 and 50' at receivers 30 and 30' transmit a "loss of signal" (LOS1 and LOS2) 55 and 55' condition to the respective transmitter 20 and 20'. LOS1 or LOS2 cause all of channels 0 through N except for the designated safety channel of the transmitter of transceivers 10 and 10' to be shut down. That is, only the designated safety channel remains enabled.

The average optical powers on the designated safety channels are set to a government or industry-implemented safe level at manufacturing thereof. However, when the fiber 40 is pulled or otherwise severed, a fault in the laser driver circuit could force a high current into the laser. This, in turn, may cause the optical power of the designated safety channel of the transmitter portions of the transceivers 10 and 10' to exceed the safety limit. Fault detection circuits, therefore, must protect the designated safety channels from launching unsafe optical power in the event of a single failure.

As set forth above, the DC coupled parallel transmitter shown in FIG. 11 does not show any method for preventing the aggregate optical power out of channels 0 through N from exceeding the safe level. Accordingly, the duplex transceivers 10 and 10' according to the present invention each include a parallel optical transmitter 20 and 20' that include fault detection circuits to thereby detect a high current condition which exceeds the safe level in the event that the ribbon fiber 40 is pulled or otherwise severed.

In the event that the fiber ribbon 40 is pulled or is otherwise severed, the signal detectors 50 and 50' on the Rx side indicate a loss of signal (LOS1 and LOS2) condition to its transmitter. LOS1 or LOS2 cause channels 0 through (N−1) of the Tx side to be shutdown, but channel N remains enabled. The transmitted optical power on channel N is pulsed at a low duty cycle by the pulse generator 25 and 25' of FIG. 1 when LOS1 is high.

A fault, however, in the laser driver circuit could force high non-switching current through the laser. This in turn, would cause the optical power of channel N to be above the safety limit. The magnitude of the pulse can be above the safety limit as long as the average optical power is below the safety limit. Choosing the correct duty cycle for the pulse is not enough. For example, the average power of a signal with a $\frac{1}{50}$ duty cycle would be approximately $\frac{1}{50}^{th}$ of the magnitude of the pulse. It would not be acceptable, however, if the laser were pulsed at a rate of 1 day on and 49 days off. Although this signal has a duty cycle of $\frac{1}{50}$, the width of the pulse cannot exceed the safety time requirement.

Figure 2:
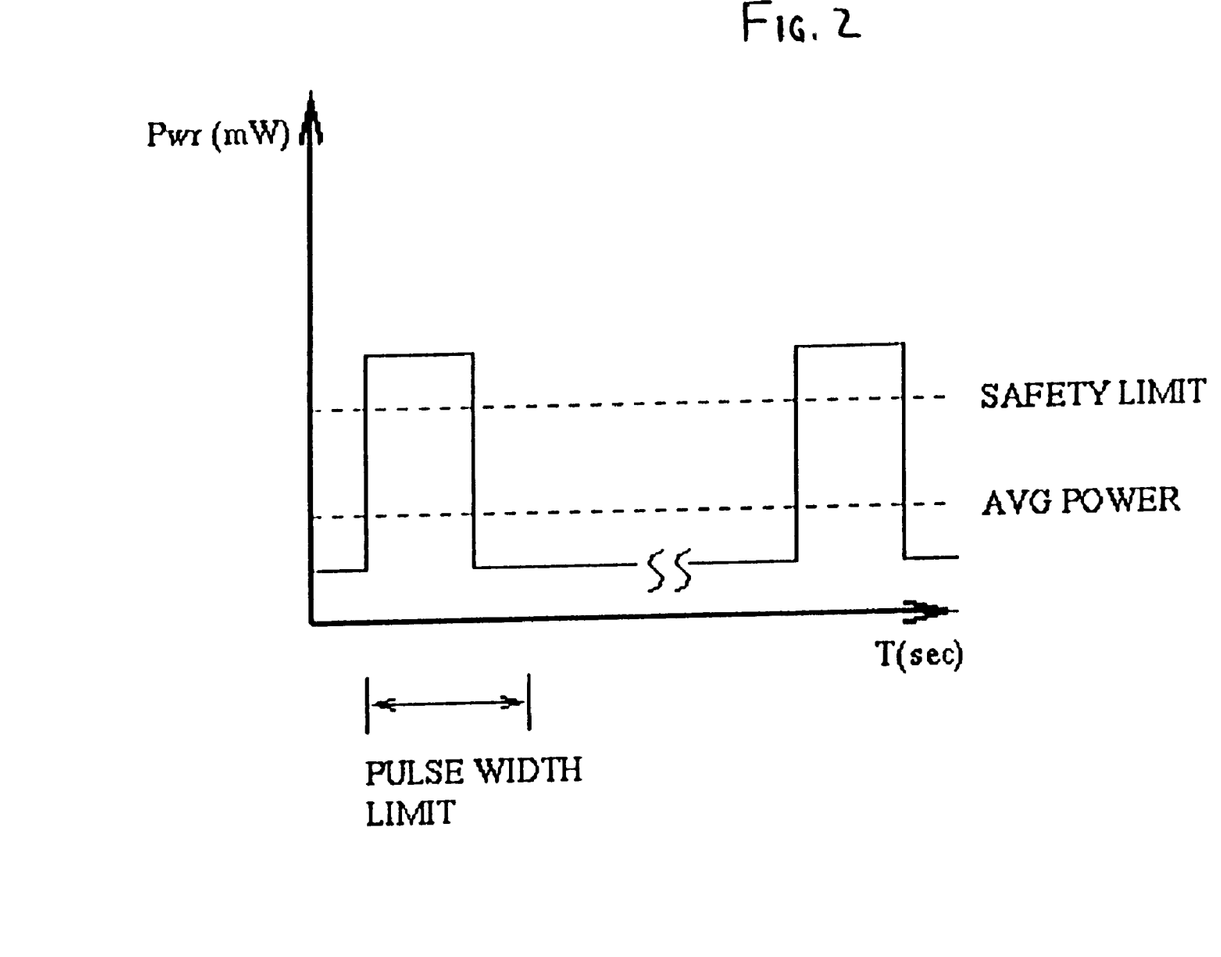
FIG. 2 shows a diagram of the safety pulse produced by an example embodiment of the present invention.

FIG. 2 shows a diagram of the safety pulse. The up pulse is shown to exceed the safety power limit, but the average optical power is well below the safety limit. Also, the width of the up pulse is well below the safety pulse limit.

Figure 3:
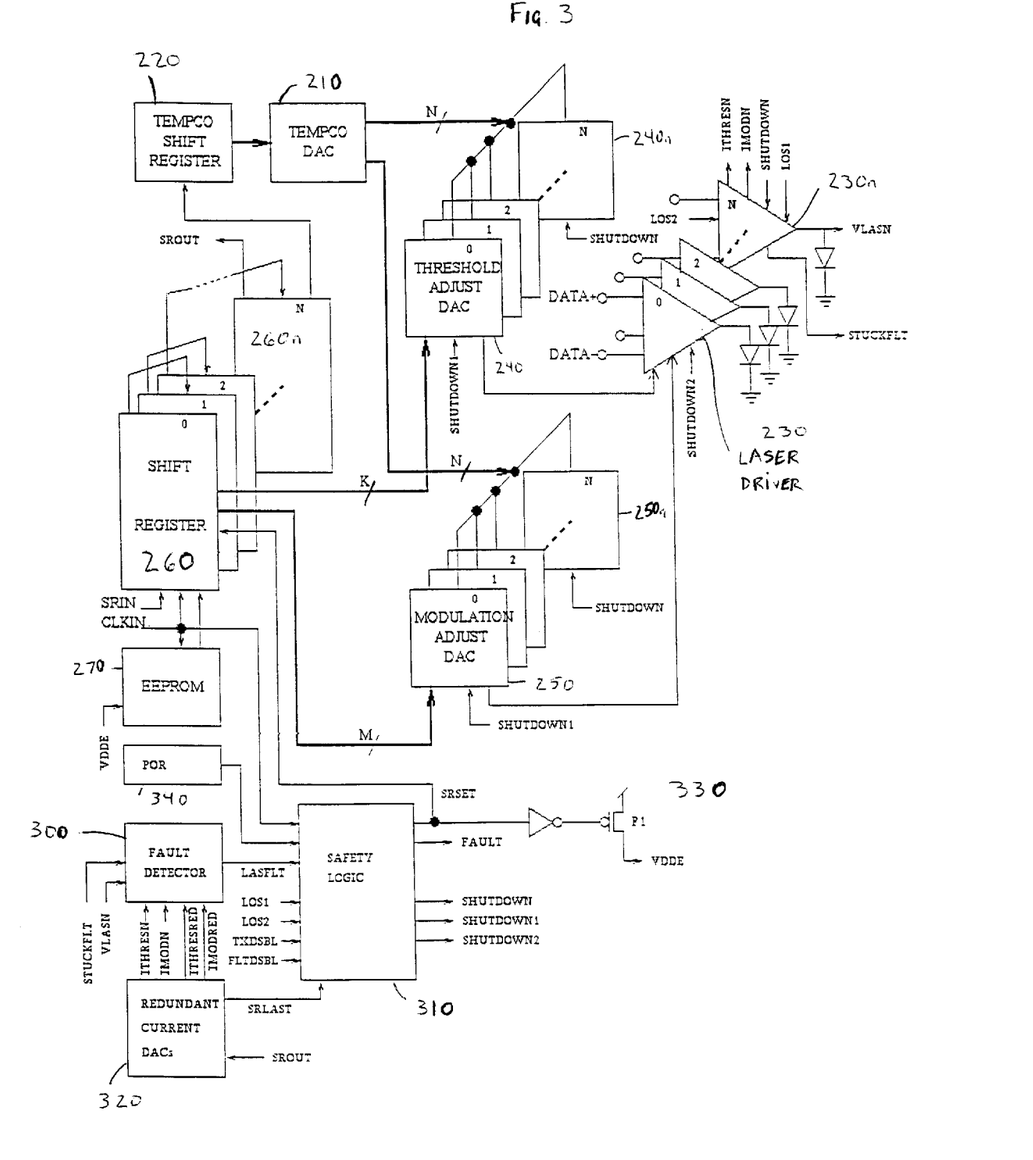
FIG. 3 shows an example of a DC coupled open loop parallel optical transmitter with fault detection and safety circuits included according to the present invention.
Figure 4:
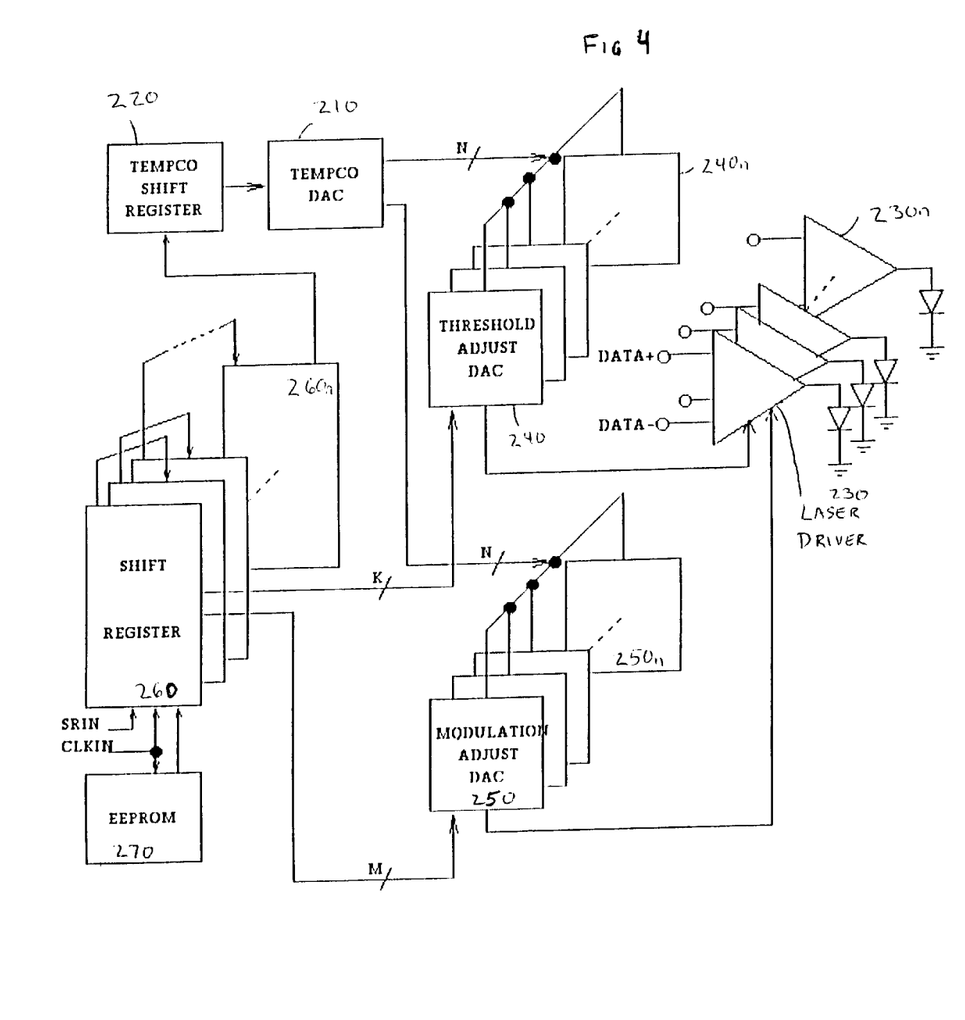
FIG. 4 shows another example of a parallel optical transmitter without fault detection and safety circuits included according to the present invention.

FIG. 3 shows a parallel optical transmitter according to an example embodiment of the present invention which detects a high current condition which causes the optical power to exceed the safe level when the ribbon fiber 40 is pulled or otherwise severed. The example embodiment of the parallel optical transmitter according to the present invention includes all of the elements of the prior art example shown in FIG. 11, and further includes laser fault detection circuit 300, safety logic circuit 310, redundant current DACs 320, PFET P1 330 and POR 340.

As an example of the safe levels below which the designated safety channel must operate when the fiber ribbon 40 is pulled or otherwise severed, IEC Class 1 safety requires that the optical power remains below the limit in the event of one failure somewhere in the link. Since the aggregate power of a parallel link exceeds the safety limit, all of channels 0 through N except for the designated safety channel must be disabled by two mechanisms, indicated by the SHUTDOWN1 and SHUTDOWN2 signals in FIG. 3. "Shutdown" is used to disable the designated safety channel. It is asserted by the safety logic block which implies that one fault already exists. If "shutdown" fails, that would be a second failure, of which safeguards against are not required by established safety standards. This configuration is regarded as being a redundant configuration. That is, if only one mechanism is used to disable the lasers transmitted on all of channels 0 through (N) except for the designated safety channel, a single fault in the laser shutdown mechanism would enable the optical power to exceed the safe level.

Figure 5:
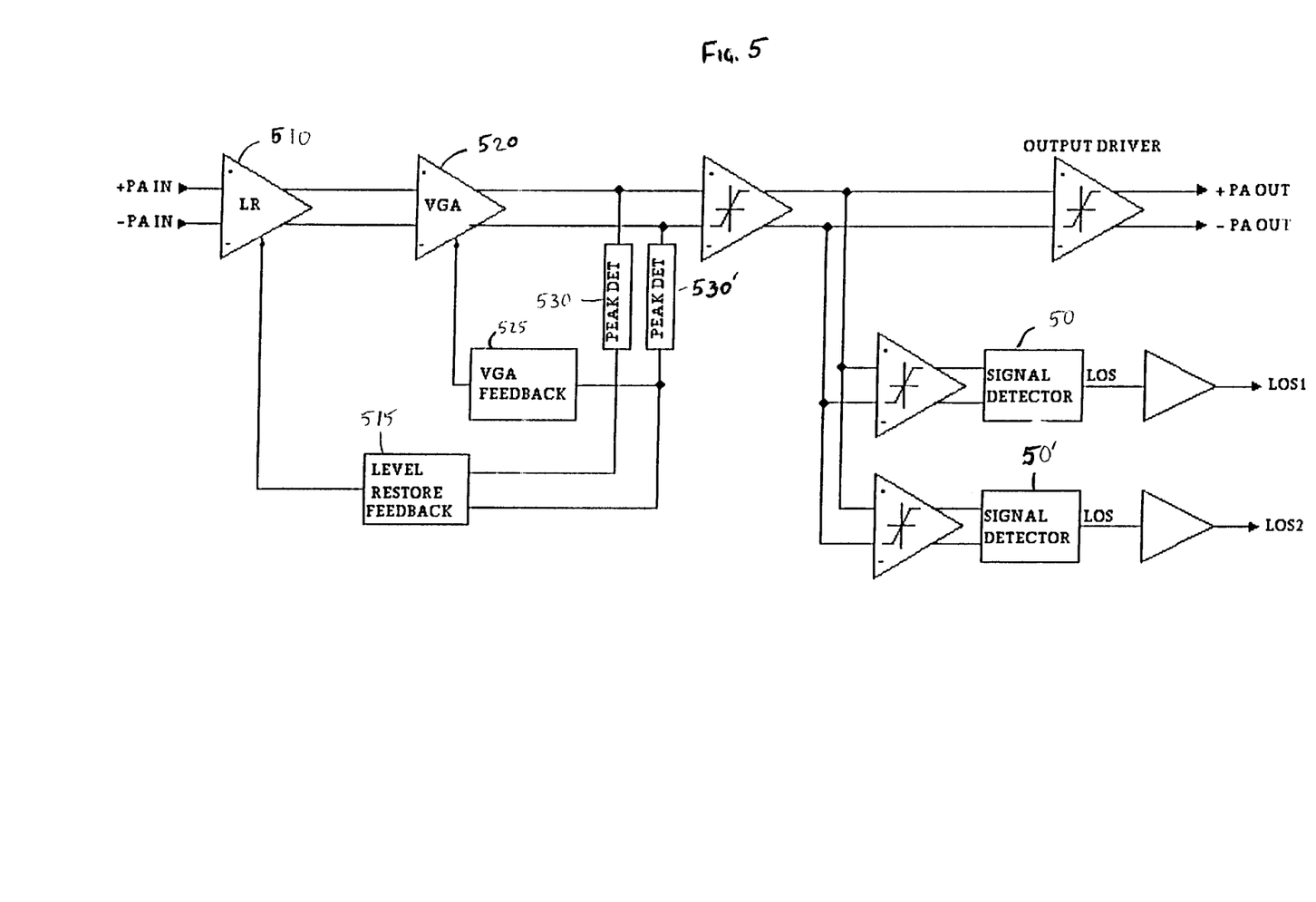
FIG. 5 shows an example of the receiver without the transimpedance amplifier in the safety channel according to an example embodiment of the present invention.

Channel N on the receivers of the DC coupled link is shown with its redundant signal detectors 50 and 50' in FIG. 5. If there is only one signal detector and its output is stuck high (indicating that a signal is present), the aggregate optical power would exceed the limit when the fiber is pulled. FIG. 5 also shows the active circuits required to set the decision threshold in the DC coupled link. The Level Restore block (LR) 510, LR feedback 515, and the peak detectors 530 and 530' compensate for any DC offset in the common mode levels of the +PA IN and -PA IN signals. The Variable Gain Amplifier (VGA) 520, VGA feedback 525, and one of the peak detectors relax the constraints on the accuracy of the level restore loop (primarily due to the peak detectors).

Another redundant part of the safety scheme involves the laser current comparison function. FIG. 3 shows laser fault detection circuit 300 that compares the threshold current and modulation current in the laser of the designated safety channel with a redundant threshold current reference and a redundant modulation current reference. The rationale for such redundancy is that, if a high laser current is caused by the circuit that generates the threshold current and modulation current, comparing these values to a current that is also generated from this faulty current generator would cause the optical power in the laser of the designated safety channel to remain at an unsafe level. Therefore, the threshold current and modulation current in the laser of the designated safety channel and the compare currents originate from independent sources. The compare currents are generated by Redundant Current DACs 320.

A further redundant part of the safety scheme involves reading the threshold DAC codes and modulation DAC codes into a shift register from an EEPROM 270 upon power up. If only part of the EEPROM data is read into the shift register 260, the threshold current or the modulation current may be too large, thus causing the optical power transmitted in the laser of the designated safety channel to be above the safe level.

Accordingly, the present invention includes two safety mechanisms, that are implemented to ensure all of the data is read into the shift register 260. The first method used is to ensure the last bit of the shift register gets loaded with a logic 0. Upon power up, the shift register 260 is set to an all logic 1 state. The first bit out of EEPROM 270 is a logic 0, which should eventually get shifted to the last bit of the shift register 260. The second method to ensure that the shift register 260 gets loaded correctly is to count the number of clock cycles required to shift the logic 0 into the last shift register location. Shift register 260 is loaded correctly when the last location in the shift register is a logic zero and the clock cycle count is correct. The logic for this function is contained in the safety logic circuit 310 of FIG. 3.

A further safety function described in FIG. 3 is the purpose for PFET P1 330. If the transmitter's power supply voltage temporarily decreases (which is often called a "glitch") low enough to cause the 340 POR circuit to indicate a low power supply condition, the shift register 260 will be set to an all "1"s state. If this power supply glitch does not also reset the EEPROM 270 (the first bit out of the EEPROM 270 must be a logic 0 for the redundant shift register read operation), data will be read into the shift register 260 starting from the wrong point in the EEPROM 270 thus causing the laser currents to be too high in the designated safety channel. These large currents could force the optical power above the safe level. PFET P1 330 therefore disables the power to the EEPROM 270 when a power supply glitch occurs on the transmitter.

Figure 6:
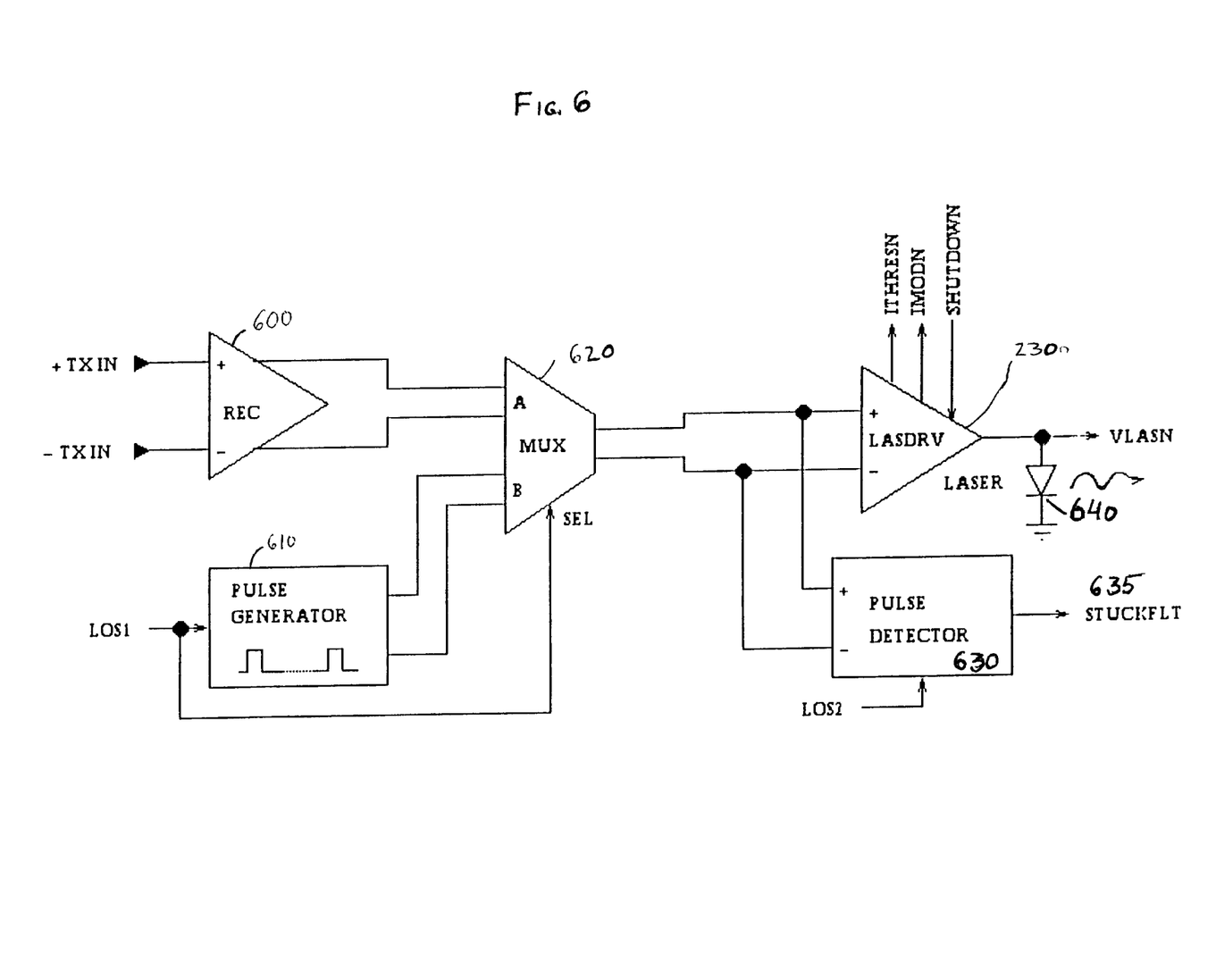
FIG. 6 shows the transmitter in the safety channel according to an example embodiment of the present invention.

Channel N of FIG. 3, which is the safety channel, is shown in more detail in FIG. 6. Channel N includes an input receiver 600, a safety pulse generator 610, a multiplexer 620, a pulse detector 630, a laser driver 230$n$, and a laser 640. The receiver 600 conditions the input differential signal into one more suitable for bipolar differential circuits. The safety pulse generator 610, corresponding to the pulse generators 25 and 25' in FIG. 1, produces the low duty cycle signal transmitted by channel N in safety mode. As set forth above, LOS1 enables the pulse generator. LOS1 also controls the multiplexer 620 to direct the proper signal to the laser driver inputs. The pulse detector 630 ensures that the width of the up pulse is not too large and that the duty cycle of the pulse signal is large enough. If either of these criteria are not met, the pulse detector forces STUCKFLT 635 to a logic 1 level. LOS2 enables the pulse detector block 630. Enabling the pulse generator 610 with LOS1 and the pulse detector 630 with LOS2 satisfies the redundancy requirement. The laser driver converts the differential voltage at its input into a current to drive the laser. ITHRESN and IMODN are multiples of the real laser threshold current and modulation current. These currents serve as inputs to the Fault Detector 300 in FIG. 3. SHUTDOWN will disable the current to the laser.

Figure 7:
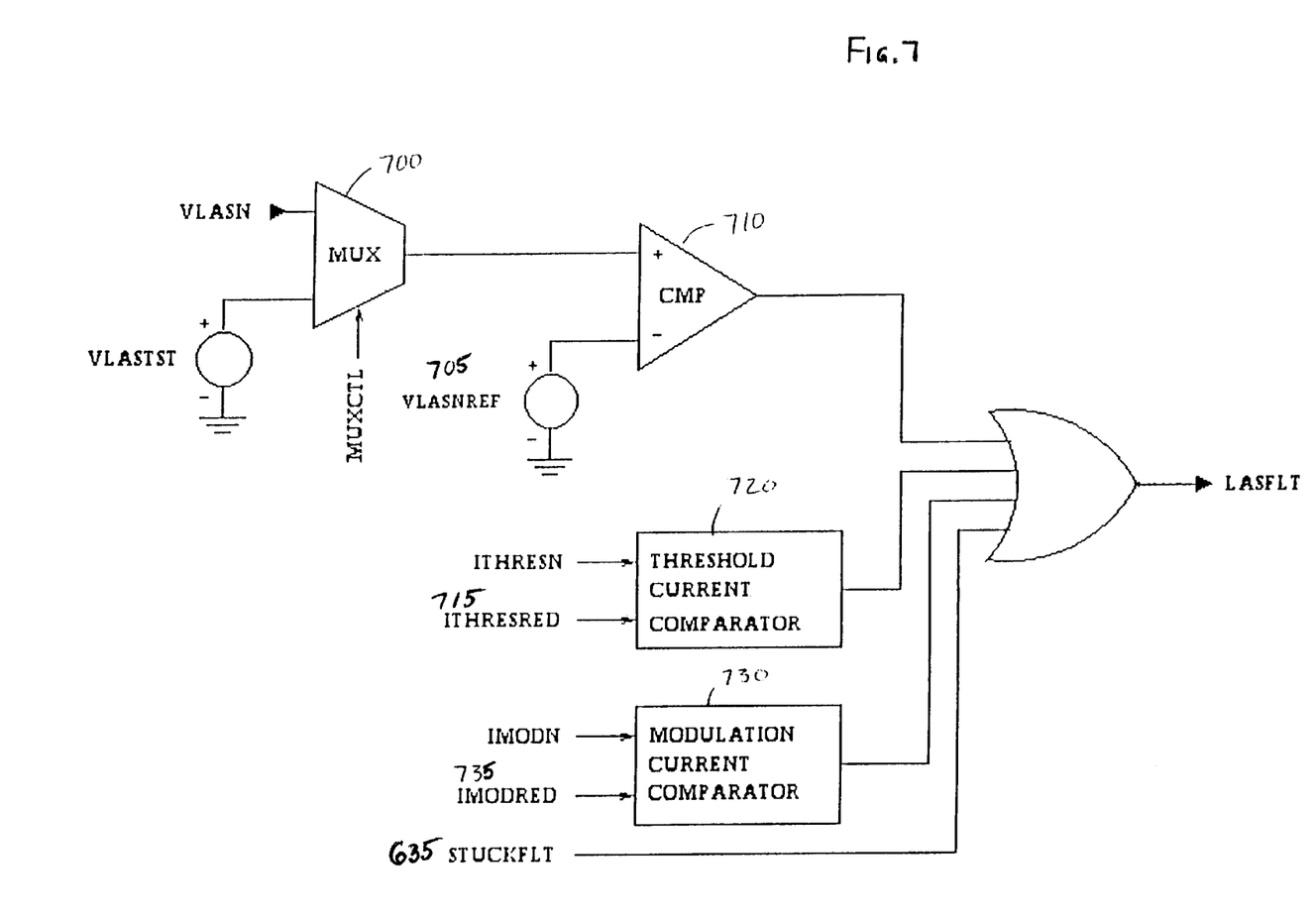
FIG. 7 shows the fault detector of the example embodiment shown in FIG. 3.

The Fault Detector 300 in FIG. 3 is shown in more detail in FIG. 7. Fault Detector 300 includes a voltage comparator (CMP) 710, whose output goes to a logic 1 value if the voltage on the laser of channel (N-1) increases to a level greater than the reference voltage, VLASNREF 705. The Threshold Current Comparator 720 forces its output to a logic 1 when the threshold current of channel N increases to a level greater than the redundant current threshold ITHRESRED 715. The Modulation Current Comparator 730 forces its output to a logic 1 when the modulation current of channel N increases to a level greater than the redundant current threshold IMODRED 735. The multiplexer MUX 700 ensures that CMP 710 functions properly during manufacturing tests. A failing voltage above VLASNREF 705 can be routed to CMP 710 to force its output to a logic 1 value. A laser fault is indicated if the output of any one of comparators 710, 720 or 730 goes to a logic 1 value.

Figure 8:
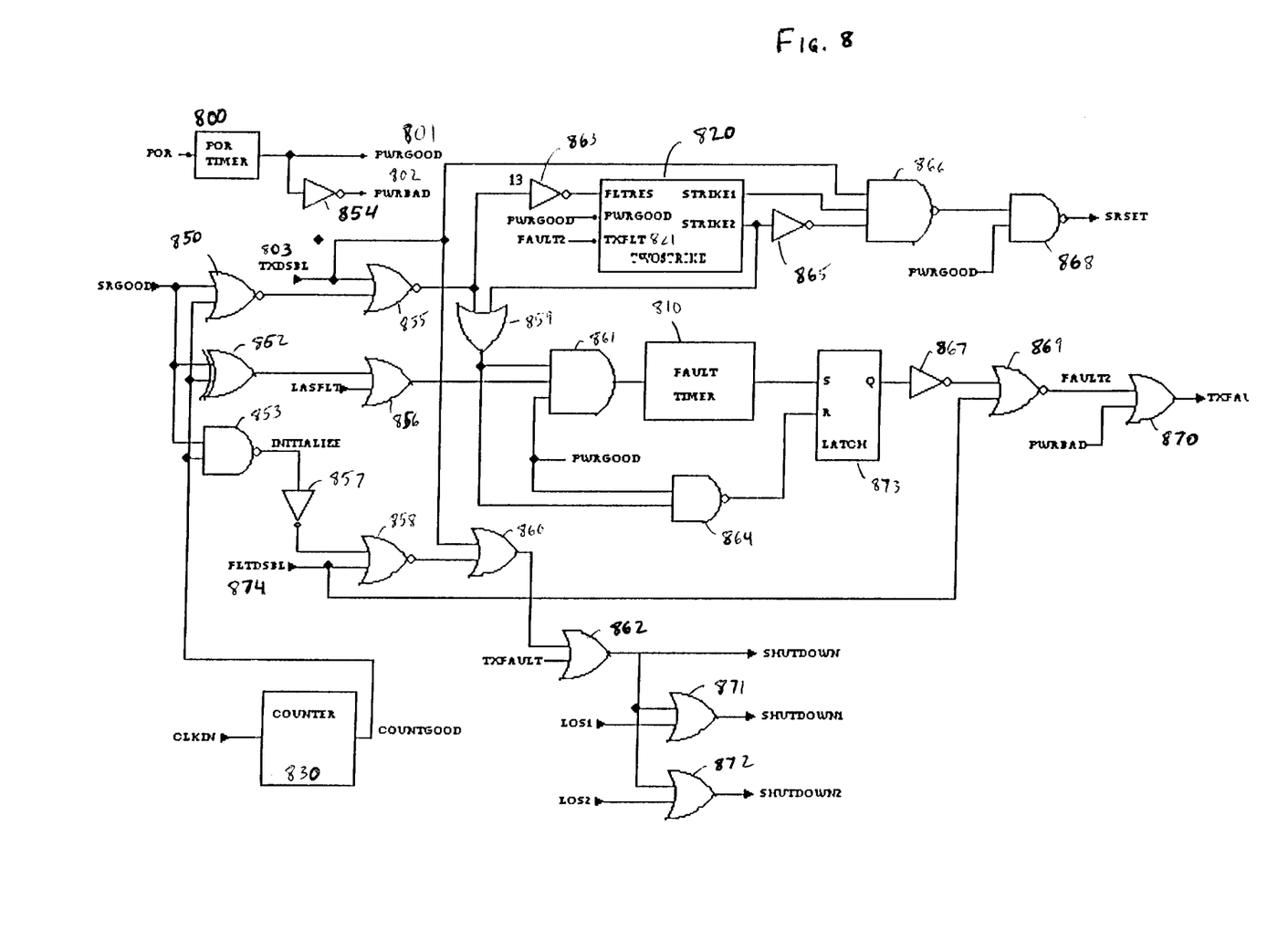
FIG. 8 shows the safety logic block of the example embodiment shown in FIG. 3.

FIG. 8 shows the Safety Logic Block 310 of FIG. 3 in more detail. The following table lists the function of each input and output of Safety Logic Block 310.

| SIGNAL | FUNCTION |
| --- | --- |
| POR | Indicates when the power supply voltage has crossed a threshold |
| TXDSBL | Clears laser fault indication on TXFAULT |
| SRGOOD | Indicates the correct data bit has been loaded into the last shift register location |
| COUNTGOOD | Logic 1 indicates the counter has reached the correct count |
| LASFLT | Indicates a laser fault condition exists in the laser driver of channel (N) |
| FLTDSBL | Used for test purposes to defeat the safety circuit |
| CLKIN | Clock used to load the data into the shift register from the EEPROM |
| TXFAULT | Indicates a fault has been detected for a period of time longer than the fault timer |
| LOS1 | One of two signals indicating an optical signal has not been detected by the receiver (Rx) |
| LOS2 | One of two redundant signals indicating an optical signal has not been detected by the receiver (Rx) |
| SHUTDOWN | Disables the laser driver of channel (N) |
| SHUTDOWN1 | One of two redundant signals to disable the laser drivers of channels 0 through (N−1) |
| SHUTDOWN2 | One of two redundant signals to disable the laser drivers of channels 0 through (N−1) |
| SRSET | Sets all bits in the shift register to a logic 1 state |

The POR timer 800 provides delay from the time the power supply crosses a minimum operational threshold. This delay allows enough time for all the circuits on the transmitter 20 chip to power up. A PWRGOOD signal 801 and a PWRBAD 802 signal are provided as outputs of the POR timer 800. PWRGOOD 801 is at a logic 1 level when the power supply voltage is above the threshold level.

The Fault Timer 810 provides delay from the time a laser fault is indicated at its input. Fault Timer 810 is used to de-glitch any temporary laser fault indications. The Two Strike block 820 allows the TXDSBL signal 803 to clear a laser fault indication on TXFLT 821 as long as a second fault does not occur within a specified time from the falling edge of TXDSBL 803. If a laser fault does occur within this specified time period, the TXDSBL signal 803 will not clear the fault indication on TXFLT 821. This prevents toggling the laser optical power at a frequency that forces the average optical power above the safety threshold. NOR gates 851 and 855 prevent a fault being indicated while the data from the shift register is being loaded. After the shift register has finished loading from the EEPROM 270 in FIG. 3, NOR gate 855 and OR gate 859 allow TXDSBL 803 to clear a fault at the input to the Fault Timer 810 as long as the STRIKE 2 output of the Twostrike block 820 is low. XOR gate 852 indicates an EEPROM 270 read fault to the Fault Timer 810. NAND gate 853 and inverter 857 shutdown lasers 0 through (N−1), via the SHUTDOWN1 and SHUTDOWN2 signals, while the data from the EEPROM 270 is being read into the shift register. OR gate 856 ORs a fault indication from the Fault Detector 300 in FIG. 3 with a shift register read fault indication from XOR gate 852. To indicate a fault at the input of the Fault Timer 810, PWRGOOD 801 must be high, the output of OR gate 856 must be high, and the output of OR gate 859 must be high. The delayed output of the Fault Timer 810 is latched by the SR Latch 873 to ensure a fault is indicated even if the condition causing the fault goes away. The SR Latch 873 can only be reset if the PWRGOOD signal 801 is low (indicating that the power supply is low). It can also be reset if TXDSBL 803 is high as long as the Twostrike block 820 has not found two faults (STRIKE 2 is low). Inverter 867 and NOR gate 869 allow the FLTDSBL signal 874 to force the TXFLT signal 821 low for testing. OR gate 870 may force the TXFAULT output 821 high if the power supply is low (PWRBAD=logic 1) or if a fault has been latched into the SR Latch 873, as long as FLTDSBL 874 is low. Inverter 865, NAND gate 866 and NAND gate 868 may set the shift register to an all logic 1 state if TXDSBL 803 is high, as long as only one fault has been indicated (but not two faults) by the Twostrike block 820 and the power supply is above the threshold level. If the power supply is low, the shift register will be set to an all logic 1 state. If a loss of signal condition is indicated by the Rx chip by LOS1 and LOS2 being in a logic 1 state. Channels 0 through (N−1) will be disabled with the SHUTDOWN1 and SHUTDOWN2 signals. The TXFAULT signal 803 indicates to the host computer that there is a problem with the laser driver. The host can then try to clear the fault by forcing TXDSBL 803 high according to the description of the Twostrike block 820.

The DC coupled parallel optical link requires specialized safety pulse generation circuits, specialized fault detection circuits, and specialized safety logic circuits to ensure the optical power of the parallel transmitter does not exceed the safety limit. The safety pulse generation circuit allows a higher optical pulse magnitude to be launched to compensate for the inherent lower sensitivity of a DC coupled optical link. The pulse width and duty cycle are set to ensure the average optical power remains below the safety limit and the duration of the pulse stays below the safety pulse limit. This concludes the description of the example embodiments. Although the present invention has been described with reference to illustrative embodiments thereof, it should be understood that numerous other modifications and embodiments can be devised by those skilled in the art that will fall within the scope and spirit of the principals of the invention. More particularly, reasonable variations and modifications are possible in the component parts and/or arrangements of the subject combination arrangement within the scope of the foregoing disclosure, the drawings and the appended claims without department from the spirit of the invention. In addition to variations and modifications in the component parts and/or arrangements, alternative uses will also be apparent to those skilled in the art.

What is claimed:

1. A method for regulating optical power in a DC coupled open loop parallel optical link upon the occurrence of an open fiber therein, said method comprising:

detecting an open fiber in an open loop parallel fiber optic link between a first transceiver and a second transceiver, wherein said fiber optic link includes a plurality of channels, one of which is a designated safety channel;

disabling data transmission on all channels except for the designated safety channel between said first transceiver and said second transceiver; and transmitting data from either of said first transceiver or said second transceiver on said safety channel at a power level that is less than a threshold optical power level, wherein the safety channel power level is generated by a safety pulse generator on said safety channel, and wherein transmitting data from either of said first transceiver or said second transceiver on said safety channel at a power level that is less than the threshold optical power level includes:

comparing a threshold current and modulation current in a laser of said designated safety channel with a redundant threshold current reference and a redundant modulation current reference, wherein the redundant threshold current reference and the redundant modulation current reference are generated by independent sources;

disabling data transmission on said designated safety channel between said first transceiver and said second transceiver if either of the threshold current and the modulation current exceed the redundant threshold current reference and redundant threshold modulation current reference in the laser of said designated safety channel, respectively; and producing, by said safety pulse generator, a low duty cycle signal in said safety channel.

2. A method according to claim 1, wherein both of said first transceiver and said second transceiver are duplex transceivers.

3. A method according to claim 2, wherein the open fiber in said fiber optic link between said first transceiver and said second transceiver is detected by a receiver of either of said first transceiver and said second transceiver.

4. A method according to claim 3, wherein said receiver that detects the open fiber in said fiber optic link between said first transceiver and said second transceiver informs an attached transmitter of a loss of signal.

5. A method according to claim 1, wherein disabling data transmission on all channels except for the designated safety channel between said first transceiver and said second transceiver is a redundant process performed by redundant disabling mechanisms.

6. A method according to claim 1, wherein said step of disabling data transmission on said designated safety channel is performed by a pulse detector.

7. A method according to claim 1, wherein transmitting data from either of said first transceiver or said second transceiver on said safety channel at a power level that is less than a threshold optical power level further includes determining that all data is read into a shift register from a non-volatile memory.

8. A method according to claim 7, wherein said non-volatile memory is an EEPROM.

9. A method according to claim 1, wherein each of the transceivers includes at least four lasers.

10. A DC coupled open loop parallel optical link having optical power therein regulated upon the occurrence of an open fiber, comprising:

a first transceiver;

a second transceiver; and a fiber optic link, including a plurality of channels, that connects said first transceiver to said second transceiver;

wherein, upon detection by either of said first transceiver or said second transceiver, that said fiber optic link has an open fiber, data transmission on all of the channels except for one designated safety channel is disabled on said fiber optic link, wherein, upon the disabling of data transmission on all of the channels except for said one designated safety channel on said fiber optic link, data is transmitted from either of said first transceiver or said second transceiver on said safety channel at a power level that is less than a threshold power level, wherein the safety channel power level is generated by a safety pulse generator on said safety channel, and wherein transmitting data from either of said first transceiver or said second transceiver at a power level that is less than a threshold power level includes:

comparing a threshold current and modulation current in a laser of said designated safety channel with a redundant threshold current reference and a redundant modulation current reference, wherein the redundant threshold current reference and the redundant modulation current reference are generated by independent sources;

disabling data transmission on said designated safety channel between said first transceiver and said second transceiver if either of the threshold current and the modulation current exceed the redundant threshold current reference and redundant threshold modulation current reference in the laser of said designated safety channel, respectively; and producing, by said safety pulse generator, a low duty cycle signal in said safety channel.

11. A DC coupled open loop parallel optical link according to claim 10, wherein both of said first transceiver and said second transceiver are duplex transceivers.

12. A DC coupled open loop parallel optical link according to claim 11, wherein the open fiber in said fiber optic link between said first transceiver and said second transceiver is detected by a receiver of either of said first transceiver and said second transceiver.

13. A DC coupled open loop parallel optical link according to claim 12, wherein said receiver that detects the open fiber in said fiber optic link between said first transceiver and said second transceiver informs an attached transmitter of a loss of signal.

14. A DC coupled open loop parallel optical link according to claim 10, wherein disabling data transmission on all of the channels except for the one designated safety channel between said first transceiver and said second transceiver is a redundant process performed by redundant disabling mechanisms.

15. A DC coupled open loop parallel optical link according to claim 10, wherein said disabling of data transmission on said designated safety channel is performed by a pulse detector.

16. A DC coupled open loop parallel optical link according to claim 10, wherein transmitting data from either of said first transceiver or said second transceiver on said safety channel at a power level that is less than a threshold power level includes determining that all data is read into a shift register from a non-volatile memory.

17. An open loop parallel optical link according to claim 16, wherein said non-volatile memory is an EEPROM.

18. A method according to claim 10, wherein each of the transceivers includes at least four lasers.

* * * * *